United States Patent
Merkle, Jr. et al.

(10) Patent No.: US 8,748,184 B2
(45) Date of Patent: *Jun. 10, 2014

(54) TITANIUM BEARING MATERIAL FLOW CONTROL IN THE MANUFACTURE OF TITANIUM TETRACHLORIDE WITH SILICA CONTENT MONITORING OF THE TITANIUM PRODUCT

(75) Inventors: James Elliott Merkle, Jr., Long Beach, MS (US); Raymond Roy Beets, Jr., Long Beach, MS (US)

(73) Assignee: E I du Pont de Nemours and Company, Wilmington, DE (US)

( * ) Notice: Subject to any disclaimer, the term of this patent is extended or adjusted under 35 U.S.C. 154(b) by 223 days.

This patent is subject to a terminal disclaimer.

(21) Appl. No.: 13/392,607

(22) PCT Filed: Sep. 2, 2010

(86) PCT No.: PCT/US2010/047660
§ 371 (c)(1),
(2), (4) Date: Feb. 27, 2012

(87) PCT Pub. No.: WO2011/028892
PCT Pub. Date: Mar. 10, 2011

(65) Prior Publication Data
US 2012/0156790 A1    Jun. 21, 2012

Related U.S. Application Data

(60) Provisional application No. 61/239,565, filed on Sep. 3, 2009.

(51) Int. Cl.
*G01N 35/00* (2006.01)
*C22B 34/12* (2006.01)
*C01G 23/02* (2006.01)
*B01J 8/18* (2006.01)

(52) U.S. Cl.
CPC .......... *C22B 34/1231* (2013.01); *C01G 23/022* (2013.01); *B01J 8/1809* (2013.01)
USPC .......................................................... 436/55

(58) Field of Classification Search
CPC .. C22B 34/1231; C01G 23/022; B01J 8/1809
See application file for complete search history.

(56) References Cited

U.S. PATENT DOCUMENTS 2,446,181 A    4/1946   Kraus
(Continued)

FOREIGN PATENT DOCUMENTS

EP        1717203         11/2006
(Continued)

OTHER PUBLICATIONS

International Search Report, Dec. 14, 2010.

*Primary Examiner* — Robert Xu
(74) *Attorney, Agent, or Firm* — Daphne Pinto Fickes

(57) ABSTRACT

This disclosure relates to a process for controlling chlorination reactions in manufacturing titanium tetrachloride in a fluidized bed reactor, followed by processing to form a titanium product comprising an amount of silica, the process comprising: (a) feeding carbonaceous material, titanium bearing material comprising an amount of silica, and chlorine to the fluidized bed reactor to form a gaseous stream, and condensing the gaseous stream to form titanium tetrachloride, a non-condensed gas stream and a condensable product stream; (b) processing the titanium tetrachloride to form a titanium product comprising an amount of silica; (c) analyzing the titanium product comprising an amount of silica to determine the analyzed concentration of silica; (d) identifying a set point concentration of silica; (e) calculating the difference between the analyzed concentration of silica and the set point concentration of silica; and (f) generating a signal which corresponds to the difference calculated in step (e) which provides a feedback response that controls the flow of the titanium bearing material into the fluidized bed reactor.

14 Claims, 1 Drawing Sheet

(56) References Cited

U.S. PATENT DOCUMENTS

| | | |
|---|---|---|
| 2,701,179 A | 2/1955 | McKinney |
| 3,591,333 A | 7/1971 | Carlson et al. |
| 3,883,636 A | 5/1975 | Cole et al. |
| 4,854,972 A | 8/1989 | Garrido et al. |
| 6,399,033 B1 | 6/2002 | Hartmann |
| 2002/0114761 A1 | 8/2002 | Akhtar et al. |
| 2008/0098933 A1 | 5/2008 | Killat |

FOREIGN PATENT DOCUMENTS

| | | |
|---|---|---|
| WO | WO96/34992 | 11/1996 |
| WO | WO2004/060808 | 7/2004 |
| WO | WO2006/115402 | 11/2006 |

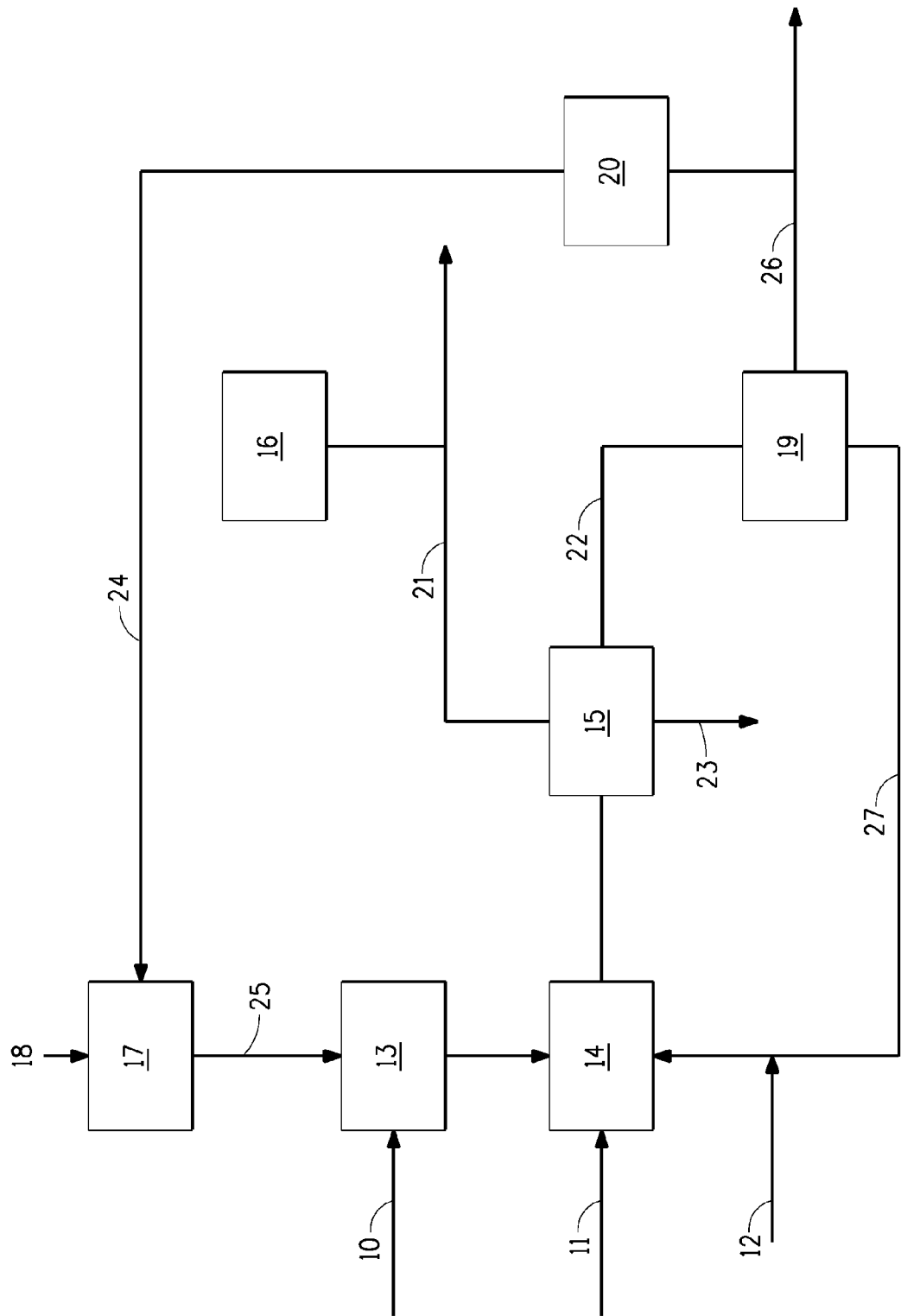

TITANIUM BEARING MATERIAL FLOW CONTROL IN THE MANUFACTURE OF TITANIUM TETRACHLORIDE WITH SILICA CONTENT MONITORING OF THE TITANIUM PRODUCT

FIELD OF THE DISCLOSURE

The present disclosure relates to a process for manufacturing titanium products, and in particular to a control process for controlling the flow of titanium bearing material into the fluidized bed reactor and thereby the amount of silicon in the final product.

BACKGROUND OF THE DISCLOSURE

The process for chlorinating titanium containing materials in a fluidized bed reactor is known. Suitable processes are disclosed in the following U.S. Pat. Nos. 2,701,179; 3,883,636; 3,591,333; and 2,446,181. In such processes, particulate coke, particulate titanium bearing materials, chlorine and optionally oxygen or air are fed into a reaction chamber, and a suitable reaction temperature, pressure and flow rates are maintained to sustain the fluidized bed. Gaseous titanium tetrachloride and other metal chlorides are exhausted from the reaction chamber. The gaseous titanium tetrachloride so produced can then be separated from the other metal chlorides and exhaust gas and used to produce titanium dioxide, titanium metal or titanium containing product.

In the chlorination process to prepare titanium tetrachloride, $TiCl_4$, in a fluidized bed reactor, it is desirable to reduce or control the formation of excess silicon tetrachloride and other undesirable chlorinated organic species. Silicon tetrachloride, $SiCl_4$, contamination of titanium tetrachloride impacts a variety of quality parameters, such as particle size distribution and primary particle size (indicated by carbon black undertone) of the titanium dioxide produced by oxidation of the $TiCl_4$. Minimizing or controlling the silica, $SiO_2$, contamination in the titanium product formed allows for improved performance of the $TiO_2$ product.

A need exists for a control process that detects the presence of excess, $SiO_2$, in the untreated oxidized material, and that is capable of correcting the problem.

SUMMARY OF THE DISCLOSURE

In a first aspect, the disclosure provides a process for controlling chlorination reactions in manufacturing titanium tetrachloride in a fluidized bed reactor, followed by processing to form a titanium product comprising an amount of silica, the process comprising:

(a) feeding carbonaceous material, titanium bearing material comprising an amount of silica, and chlorine to the fluidized bed reactor to form a gaseous stream, and condensing the gaseous stream to form titanium tetrachloride, a non-condensed gas stream and a condensable product stream;

(b) processing the titanium tetrachloride to form a titanium product comprising an amount of silica;

(c) analyzing the titanium product comprising an amount of silica to determine the analyzed concentration of silica;

(d) identifying a set point concentration of silica;

(e) calculating the difference between the analyzed concentration of silica and the set point concentration of silica; and (f) generating a signal which corresponds to the difference calculated in step (e) which provides a feedback response that controls the flow of the titanium bearing material into the fluidized bed reactor.

BRIEF DESCRIPTION OF THE DRAWINGS

FIG. 1 sets forth a simplified schematic flow diagram of an embodiment of this disclosure.

DETAILED DESCRIPTION OF THE DISCLOSURE

Carbonaceous material, titanium bearing material containing some impurities, chlorine, and optionally oxygen or air are fed into a fluidized bed reactor. Typical conditions and specifications for fluidized beds useful for this disclosure are as follows: reaction temperature of about 900° C. to 1300° C., pressure of about 1-3 atmospheres, and a reactor with multiple jets in or near the base. Typically, the point of introduction of the chlorine will be located within about 0 to about 10 feet (about 0 to about 3 m), more typically about 0 to about 8 feet (about 0 to about 2.4 m) and most typically about 0 to about 5 feet (about 0 to about 1.5 m) of the base of the reactor. A most typical location is in the base of the reactor.

The titanium bearing material can be any suitable titanium source material such as titanium containing ores including rutile, ilmenite or anatase ore; beneficiates thereof; titanium containing byproducts or slags; and mixtures thereof. Ordinarily, the titanium bearing material contains iron oxide in the amount of about 0.5-50%, and typically up to about 20% by weight, based on the total weight of the titanium bearing material. This material also typically contains silica. The silica can be present in any form, including in a silica-containing material or a metallic oxide, but is usually in the form of one or more naturally occurring forms such as sand, quartz, silicates, silica, $SiO_2$, and Crystobalite. The silica can be in the amount of about 0 to about 25%, and typically about 0.5 to about 1.5%, based on the total weight of the titanium bearing material. The amount of silicon in the titanium bearing material can be determined by XRF analysis or wet chemistry methods or other suitable analytical procedure. The silica can be the source of silicon tetrachloride in the gaseous stream of the fluidized bed reactor.

Suitable carbonaceous material for use in this disclosure is any carbonaceous material which has been subjected to a coking process. Typical is coke or calcined coke which is derived from petroleum or coal or mixtures of such cokes.

As shown in FIG. 1, a titanium bearing material 10 is fed through a control device 13 to the fluidized bed reactor 14. Carbonaceous material 11 is fed directly into the fluidized bed reactor 14. Alternately, carbonaceous material 11 may be fed to the fluidized bed reactor 14 via a control device. The titanium bearing material and the carbonaceous material can also be combined prior to being fed to the fluid bed reactor. The chlorine 12 is fed into the fluidized bed reactor 14 with a recycle stream that recycles chlorine liberated during the oxidation of $TiCl_4$ to $TiO_2$ in the oxidation reactor 19 or if chlorine is released during other processing. Gaseous reaction products from the fluidized bed reactor are cooled in condenser(s) 15, in stages, to first condense and remove iron and metal chlorides other than titanium tetrachloride 22. The iron and metal chlorides form the condensable product stream 23. The remaining product from the reactor is then cooled to condense titanium tetrachloride 22 leaving a non-condensed gas stream 21 comprising $N_2$, COS, CO, $CO_2$, and HCl and other components such as $SiCl_4$.

The titanium tetrachloride 22 is then processed to form a titanium product 26 comprising an amount, typically a minor amount, of silica. In one specific embodiment, the titanium tetrachloride 22 is then processed in, for example an oxidation reactor 19 to form a titanium product such as an untreated oxidized material, e.g. titanium dioxide comprising an amount of silica.

A portion or all of the titanium product stream 26, i.e., a sample stream, is sent to an analytical device or analyzer 20 such as a spectrometer, typically an XRF spectrometer, spectrophotometer and chromatograph.

A sampling system may be required depending on the type of analyzer chosen, the condition of the titanium product and/or the placement of the analyzer. The analytical device can be in-line, meaning installed directly in the path of the stream to be analyzed, typically the titanium product stream 26, or on-line, meaning a portion of the stream to be analyzed, typically the titanium product stream 26, is directed away from the main process stream and toward the analytical device or off-line meaning a sample is collected and analyzed discretely. The sample stream is analyzed for $SiO_2$ concentration. The analysis is able to proceed quickly, semi continuously and quantitatively. Suitable means of analysis include, but are not limited to, spectroscopy, spectrometry and chromatography. Typically, a spectroscopic method is used to analyze the $SiO_2$ concentration of the titanium product stream 26. Most typically, XRF spectroscopy is used. Optionally, any portion of the sample stream can be returned to the stream being analyzed, typically the titanium product stream 26.

A first signal 24 (electrical, pneumatic, digital, manual, etc.) is generated from the analysis that is related to the silica, $SiO_2$, concentration in the titanium product stream 26. The signal proceeds to a control system 17 (such as a distributed control system or other feedback control system) where its value is compared to a set point 18 or determined if it is within a set range. The set point can be a single value reflecting an acceptable $SiO_2$ concentration or the upper limit of a range of values within which an acceptable $SiO_2$ concentration can be. This set point 18 is a predetermined or a preset value meaning it is a desired or acceptable $SiO_2$ concentration. Subtracting the $SiO_2$ concentration from the analysis from the predetermined acceptable $SiO_2$ concentration set point can provide the $SiO_2$ concentration difference that will generate the signal that adjusts the flow of the titanium bearing material 10 to the fluidized bed reactor 14. Under these conditions the full range of concentration of $SiO_2$ is about 0 to about 0.3 weight % $SiO_2$. The set point can be any desired value within this range. Typically, the $SiO_2$ concentration set range is about 0 to about 0.1 weight % and more typically about 0.01 to about 0.06 weight % of the total content of the titanium product stream 26. It is important that the lower limit to the set range of $SiO_2$ concentration is not below the detectability limit of the analytical device being used If the controlled variable does not equal the set point or is outside of the set range, then the difference between the measured controlled variable and set point concentration or concentration range upper limit is determined. A second signal (electrical, pneumatic, digital, etc.) corresponding to this difference is generated either manually or by a suitable feedback controller 17 such as, for example, a proportional, a proportional integral or a proportional integral derivative action controller or other suitable computer software or algorithm that provides a feedback response to the control device 13 which will cause a change in the amount of titanium bearing material being added to the fluidized bed reactor by making a change, typically a proportional change, in the flow rate of the titanium bearing material to the fluidized bed reactor 14. With continuous or discrete monitoring of the controlled variable, the amount of the titanium bearing material added to the fluidized bed reactor can be changed until the controlled variable reaches the set point or is within the set range, as specified for the process. If the $SiO_2$ concentration in the titanium product stream 26 is determined to be outside of the set range, appropriate changes to the amount of the titanium bearing material being added to the the fluidized bed reactor 14 will be implemented. For example, if it is found that the analyzed $SiO_2$ concentration is above the set point, the amount of the titanium bearing material being added to the fluidized bed reactor 14 will be increased by an amount proportional to the amount of $SiO_2$ above the upper limit or set point. Alternately, the amount of titanium bearing material can be decreased if the silicon tetrachloride concentration analyzed is below the set point.

A typical titanium product produced from the titanium tetrachloride of this disclosure is titanium dioxide in which case the fluidized bed reactor can be followed by oxidation to form a suitable titanium dioxide product such as pigmentary titanium dioxide or titanium dioxide nanoparticles. Other titanium products are also contemplated such as titanium metal which can be made from the titanium tetrachloride by a known processes such as the Kroll and Hunter processes. The process of this disclosure which permits control of the silicon dioxide can produce a useful titanium dioxide product having a low silica concentration.

The disclosure can additionally provide an improved process for controlling chlorination reactions in the manufacture of titanium tetrachloride in a fluidized bed reactor.

To give a clearer understanding of the disclosure, the following example is construed as illustrative and not limitative of the underlying principles of the disclosure in any way whatsoever.

EXAMPLE $SiO_2$ concentration in the base pigment is known to correlate with a variety of quality parameters, such as particle size distribution and primary particle size (indicated by carbon black undertone) of the titanium dioxide produced by oxidation of the $TiCl_4$ Over a period of approximately three and a half months experimentation was carried out in a plant to demonstrate the effect of automated $SiO_2$ control. Three hundred and four consecutive product samples were collect and analysed for $SiO_2$. This was compared with 304 samples prior to any silica control. The variability in the product concentration was measured and provided in Table 1.

TABLE 1

| | Base TiO$_2$ Product SiO$_2$ Concentration Standard Deviation |
|---|---|
| TiO$_2$ Bearing Material Feed Control Method | 0.0489 |
| SiO$_2$ Based TiO$_2$ Bearing Material Feed Control Method | 0.0224 |
| Reduction in Base Pigment SiO$_2$ Standard Deviation | 54% |

The previous TiO2 bearing material feed control method noted in Table 1 was based on reactions in the chlorinator including theoretical consumption rate of titanium bearing materials and inferential chlorine discharge rate.

From the foregoing description, one skilled in the art can easily ascertain the essential characteristics of the disclosure, and without departing from the spirit and scope thereof, can make various changes and modification of the disclosure to adapt it to various usages and conditions.

Having thus described and exemplified the disclosure with a certain degree of particularity, it should be appreciated that the following claims are not to be limited but are to be afforded a scope commensurate with the wording of each element of the claims and equivalents thereof.

What is claimed is:

1. A process for controlling chlorination reactions in manufacturing titanium tetrachloride in a fluidized bed reactor, followed by processing to form a titanium product comprising an amount of silica, the process comprising:
    (a) feeding carbonaceous material, titanium bearing material comprising an amount of silica, and chlorine to the fluidized bed reactor to form a gaseous stream, and condensing the gaseous stream to form titanium tetrachloride, a non-condensed gas stream and a condensable product stream;
    (b) processing the titanium tetrachloride to form a titanium product comprising an amount of silica;
    (c) analyzing the titanium product comprising an amount of silica to determine the analyzed concentration of silica;
    (d) identifying a set point concentration of silica;
    (e) calculating the difference between the analyzed concentration of silica and the set point concentration of silica; and
    (f) generating a signal which corresponds to the difference calculated in step (e) which provides a feedback response that controls the flow of the titanium bearing material into the fluidized bed reactor.

2. The process of claim 1 wherein the analyzed concentration of silica is greater than the set point concentration of silica.

3. The process of claim 1 wherein the analyzed concentration of silica is less than the set point concentration of silica.

4. The process of claim 2 wherein the analyzed concentration of silica is greater than the set point concentration of silica and the feedback response comprises increasing the amount of titanium bearing material being introduced into the fluidized bed reactor.

5. The process of claim 3 wherein the analyzed concentration of silica is less than the set point concentration of silica and the feedback response comprises decreasing the amount of titanium bearing material being introduced into the fluidized bed reactor.

6. The process of claim 1 wherein the analyzed concentration of silica is determined by analyzing the titanium product.

7. The process of claim 1 wherein analyzing the titanium product is achieved by spectroscopy, spectrometry or chromatography.

8. The process of claim 7 wherein analyzing the titanium product is by XRF spectroscopy.

9. The process of claim 1 wherein the silica is present in the titanium product in the amount of about 0 to about 0.3 weight %, based on the total weight of the titanium product.

10. The process of claim 1 wherein the silica is present in the titanium product in the amount of about 0.0 to about 0.1 weight %, based on the total weight of the titanium product.

11. The process of claim 1 wherein the silica is present in the titanium product in the amount of about 0.01 to about 0.06 weight %, based on the total weight of the titanium product.

12. The process of claim 1 wherein the desired concentration of silica is about 0.01 to about 0.3 mole %.

13. The process of claim 1 wherein the signal is electrical, pneumatic, digital or manual.

14. The process of claim 1 wherein the feedback response is provided by a feedback controller selected from the group consisting of a proportional action controller, proportional integral action controller, a proportional integral derivative action controller; or suitable computer software or algorithm that provides a feedback response to a control device.

* * * * *